Sept. 1, 1925.  1,551,739
A. C. GOUGH ET AL
TURRET TOOL HOLDER
Filed May 5, 1924   4 Sheets-Sheet 3
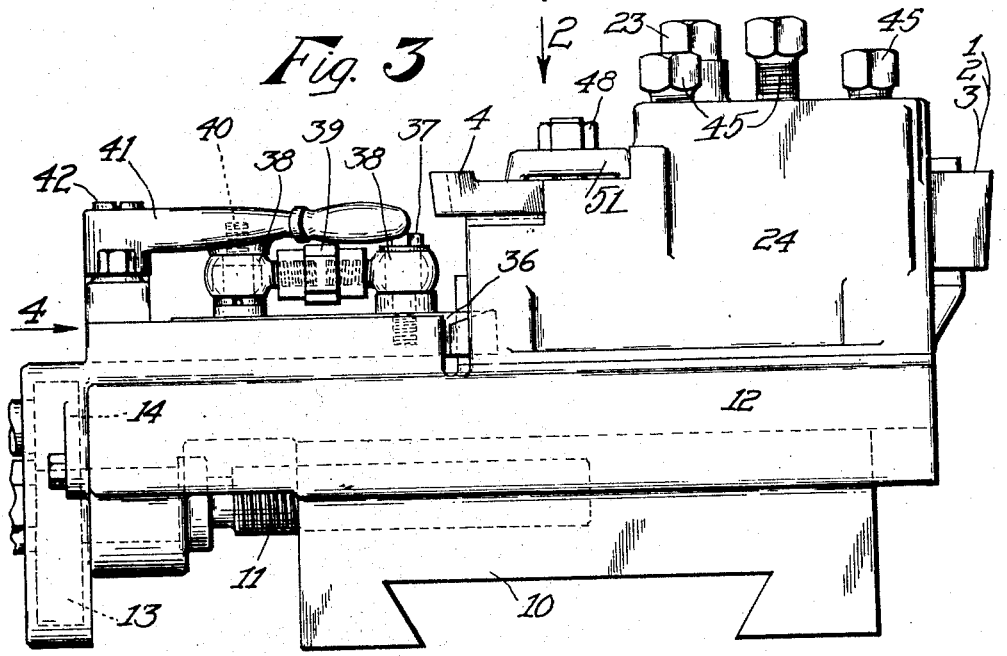
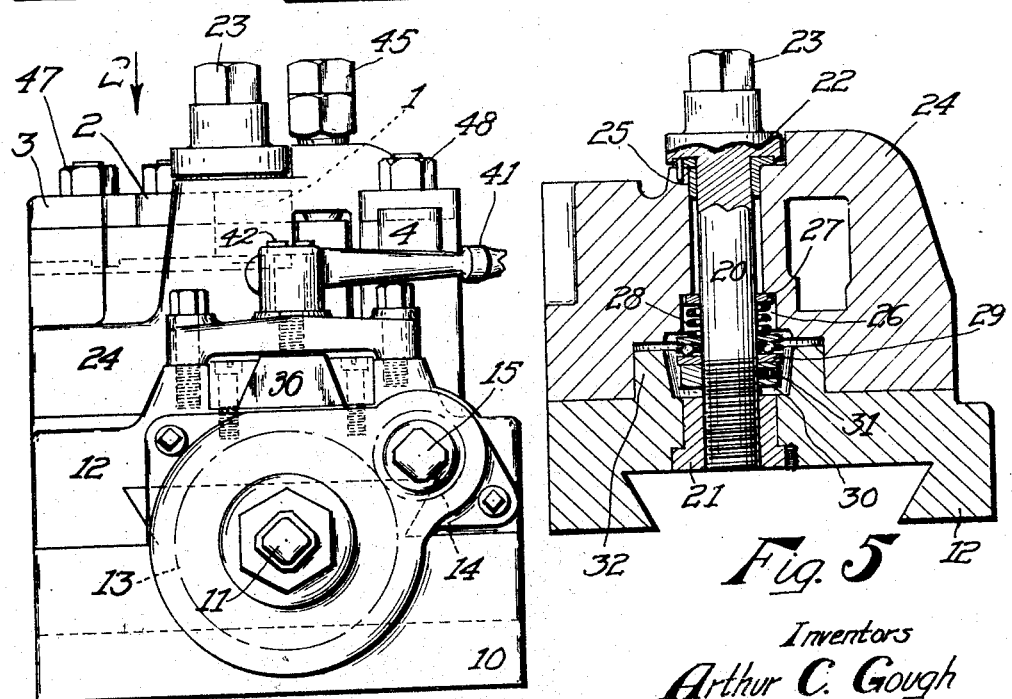
Inventors
Arthur C. Gough
Marmaduke M. Wills
By Attorneys

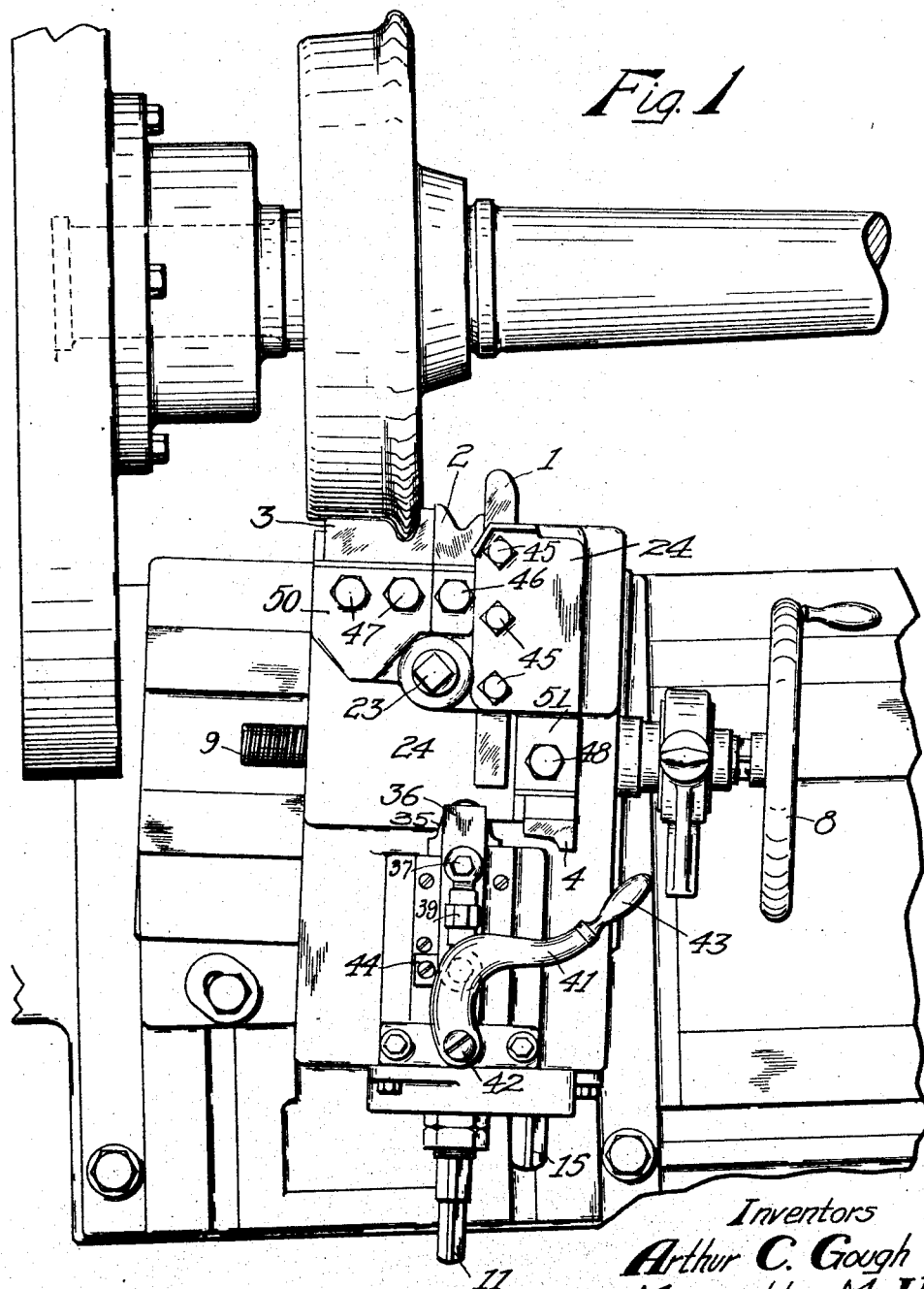

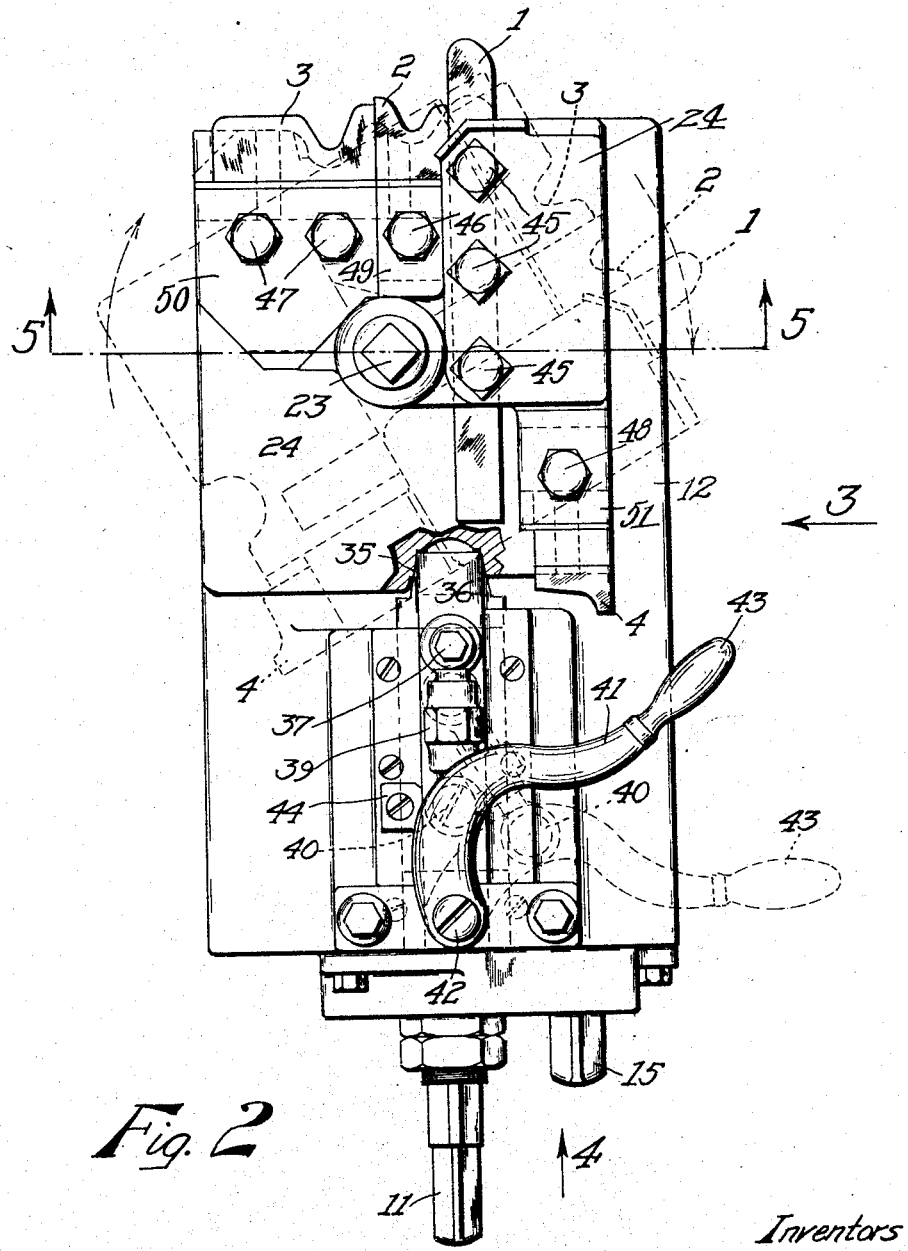

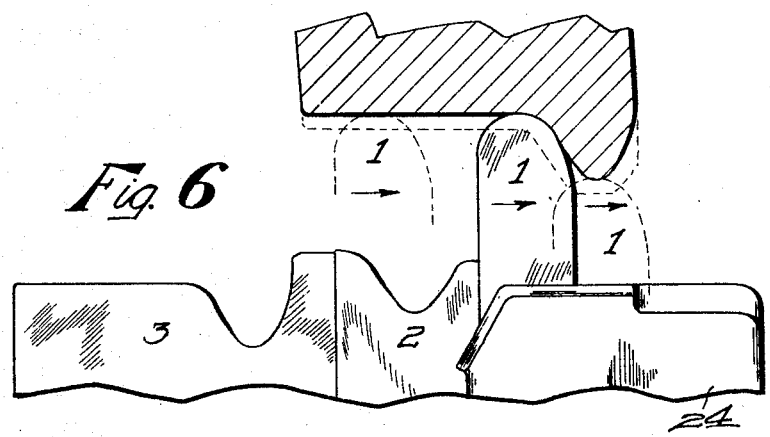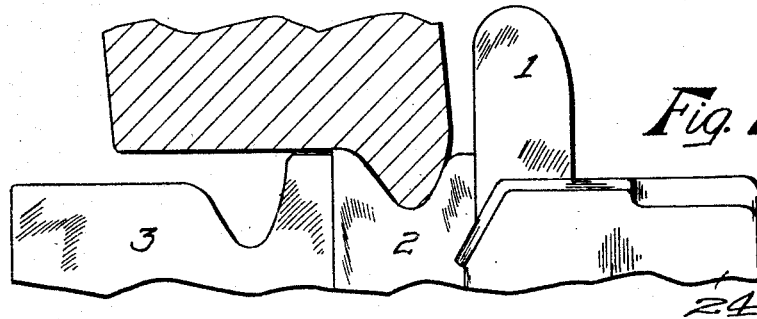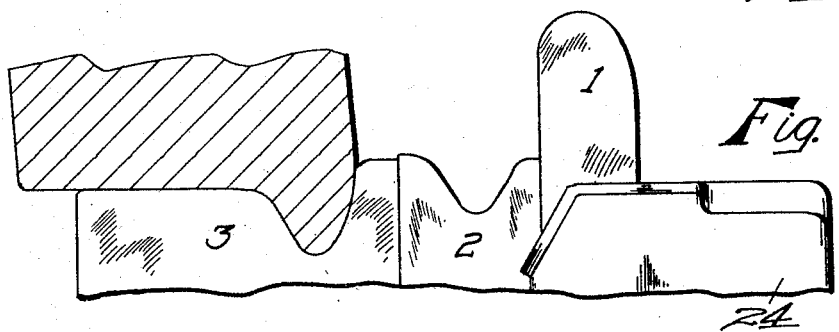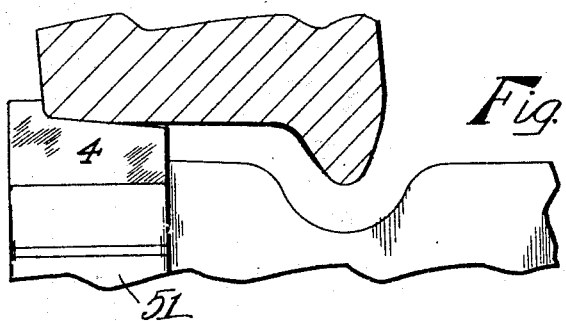

Patented Sept. 1, 1925.

1,551,739

UNITED STATES PATENT OFFICE.

ARTHUR CHARLES GOUGH AND MARMADUKE MOORE WILLS, OF FITCHBURG, MASSACHUSETTS, ASSIGNORS TO MANNING, MAXWELL & MOORE, INC., OF NEW YORK, N. Y., A CORPORATION OF NEW JERSEY.

TURRET TOOL HOLDER.

Application filed May 5, 1924. Serial No. 710,978.

*To all whom it may concern.*

Be it known that we, ARTHUR CHARLES GOUGH and MARMADUKE MOORE WILLS, both citizens of the United States, both residing at Fitchburg, in the county of Worcester and State of Massachusetts, have invented a new and useful Turret Tool Holder, of which the following is a specification.

This invention relates to a turret tool holder especially adapted for holding the tools used in turning the worn surfaces of locomotive and car wheels, but the principles thereof are capable of general use.

The principal objects of the invention are to provide an improved arrangement of tools on the holder so as to increase the convenience of use of such a tool holder; and to provide an improved and simplified mechanism for locking the tool holder in either of its operative positions. The invention also involves the provision of an improved ball bearing construction for the rotating turret having a balancing spring.

Other objects and advantages of the invention will appear hereinafter.

Reference is to be had to the accompanying drawings in which—

Fig. 1 is a plan of a portion of a wheel lathe showing a preferred embodiment of this invention in position for performing the finishing operation on the tread and flange on the wheel;

Fig. 2 is a plan of the tool holder itself with parts broken away to show the locking of the turret and also illustrating its turning in dotted lines;

Fig. 3 is a side view of the same;

Fig. 4 is a rear end elevation;

Fig. 5 is a transverse sectional view through the center of the turret;

Fig. 6 is a diagrammatic view showing the first roughing operation;

Fig. 7 is a similar view showing the second roughing operation as applied to the flange of the wheel;

Fig. 8 is a similar view showing the finishing operation on the flange and the first slope of the tread; and Fig. 9 is a similar view showing the finishing of the second slope of the tread.

We have shown the invention as applied to the refinishing of a used locomotive car wheel in the ordinary manner. Ordinarily a pair of wheels on their axle is inserted in a lathe of special construction and two tool holders are employed to operate on the two wheels at the same time. This, however, is not a feature of this invention and it can be used either in this way or in any other desired way so we have shown its operation on only one wheel. The one operating on the other wheel would be constructed in the opposite way with respect to the one shown. It is not necessary to describe the entire mechanism for supporting the tools as this invention is adapted to be supported on the usual slides. These slides are adapted to be fed along the work by power, but that part is not shown herein. We have, however, shown a slide 10 that is arranged to feed by power along the work nearly parallel with the axis of the axle or by the screw 9 and hand wheel 8. The slide is provided with transverse ways on its top for receiving a transverse slide 12. By a screw 11 this slide is adapted to be moved toward and from the work. On this screw is a gear 13 operated by pinion 14 on a stud 15 having a square end on which can be placed a hand wheel or wrench for feeding the slide 12 back and forth by hand to adjust it to the proper distance from the axis of the wheel being turned and take off the right amount of stock. The end of the screw 11 is also shown as having a square end so that the hand wheel can be put directly on it to move it rapidly.

On this slide 12 is located a vertical center bolt 20. This is adapted to be screwed into a bushing 21 fixed in the slide and is provided with a circular shoulder 22 and with a square end 23 for the reception of a wrench. This bolt passes through a larger passage located vertically in the rotatable turret 24 and is steadied at the top by a flanged bushing 25.

At the bottom the turret tool holder 24 is provided with an enlarged recess 26 having a square shoulder at the top against which engages a flat collar 27. Under this collar is a spring 28 engaging at its lower end the top of a ball bearing cage 29 surrounding the bolt. The lower member of this rests on a collar 30 which is fixed by a set screw 31 to the bolt. It will be seen that the spring 28 exerts pressure between the turret tool holder 24 and the ball bearing on the bolt 20, and when the bolt is screwed down into the bushing 21 to hold the turret 24 fixed in its adjusted position the pressure on this spring is decreased. When the bolt is turned back to release it, the ball bearing and spring co-operate to reduce the friction resisting the turning of the turret 24. The spring tends to reduce its pressure on its other supporting surfaces and the ball bearing carries a larger proportion of the weight. It will be seen that the slide 12 has a cylindrical projection 32 over which fits a similar shaped recess at the bottom of the turret 24 concentric with the bolt 20. The bearing projection 32 has a recess in its center for the collar 30.

The turret tool holder 24 is rectangular in cross section or substantially so and it is adapted to be turned on the axis of the bolt 20 to two different positions. In either position it is adapted to be locked by means now to be described. The tool holder is provided with finished recesses 35 in two opposite sides. Into either recess a locking bolt 36 is adapted to be engaged. This locking bolt is guided in a guide slot on the top of the slide 12 to move longitudinally with respect to that slide. It is provided with a screw 37 extending upwardly from it which receives the eye-end of a screw 38. There is a similar screw 38 in line with this one, and the two together, with a turn buckle 39 between them, constitute a link for operating the bolt 36. The eye-end of the other screw 38 is secured by screw or bolt 40 to a lever 41. This lever is pivoted at 42 on the slide 12 and the screw 40 is located between this pivot 42 and the screw 37. The handle 43 of the lever 41 extends out to one side beyond the screw 40.

On the head of the screw 38 which is connected with the screw 40 there is a finished surface which engages a fixed stop 44 on the slide 12. This constitutes a toggle joint having an adjustable link which will force the bolt 36 into locking position when it is just over the center as indicated in Fig. 1, and the finished surface is resting against the stop 44. Therefore the toggle will not be thrown out of operation by the jarring and strain on the machine. However, when it is thrown out, as indicated in dotted lines in Fig. 2, the bolt is drawn back and the turret can be turned as indicated in dotted lines in that figure. It locks the turret without moving it.

To avoid the unnecessary motions of turning the turret after every operation we provide the turret with a series of parallel slots for receiving a first roughing tool 1, a contour roughing tool 2, and a first contour finishing tool 3 for the first slope and flange on one side or end of the turret. The roughing tool 1 is located in a slot extending clear through the turret at its top and held in position by the usual binding screws 45.

The contour roughing tool 2 is located in a slot which extends only part way through the turret and is held by a binding screw 46 and clamp 49. The contour finishing tool 3 is held in a similar slot and is held by the screw 47 and clamp 50. These three slots in the turret are located parallel with each other and all on one face of the turret. This is very convenient as these three tools are used one after the other as will appear later, and all of them can be employed without turning the turret at all, thus reducing the necessary operations by the attendant and reducing the time of finishing the wheel. Yet the width of the turret is not increased.

On the opposite end of the turret we have provided a fourth tool 4 located in a slot parallel with the other slots and held by a binding screw 48 and clamp 51. When the first three tools have finished their operations the slide is drawn back and the bolt released so that the turret can be turned around 180 degrees and then this last tool 4 can be employed for the purpose of finishing off the second slope of the tread of the wheel. In this way it is not necessary to have any tools projecting from two sides of the turret, nor any means on those two sides for holding it in position.

In the use of the device the turret is set first with the tool 1 a little to the left of the position shown in Fig. 6 in dotted lines. The slide is fed along by power in the direction of the arrow to rough off the worn tread of the wheel clear from the edge up to the flange as shown in full lines. The motion is parallel to the tapered surface of the tread. The power feed is disconnected here in the usual way and the slide 12 is drawn back until the end of the tool 1 is at the position of greatest desired circumference of the flange. Then it is fed along parallel with the work to rough off the top of the flange if that is desired. Whether this operation happens to be necessary or not, the slide is fed along by hand or power as may be desired until the tool 2 comes opposite the flange of the wheel. Then the slide is fed up, by hand preferably, until tool 2 comes up into the position shown in Fig. 7 to rough off the flange of the wheel substantially to the desired contour. Now the slide is drawn back again until this tool can clear the wheel, then moved further along to the right until tool 3 is in the proper position for operating on the wheel. The slide is then moved forward the proper distance by hand and held up to the work until the contour of the flange and first slope of the wheel is finished. This finishes the entire surface of the wheel with which this contour tool 3 comes into contact.

Now the slide is drawn back again far enough for the next operation. The turret is unlocked by drawing the handle 43 out to the dotted line position in Fig. 2. A wrench is put on the head 23 and the bolt 20 is raised enough to release the turret so that it can be turned around 180 degrees. This is done by hand or by placing the wrench on any one of the other bolt heads on the top of it. It is turned around very easily until it is nearly in the right position. Then the lever 43 is brought back to the full line position when the bolt 36 will be locked in a second notch like 35, not shown in that figure. This locks the turret in that position. The bolt 20 is tightened down also. Now the slide is brought up to the wheel until tool 4 can come into the position shown in Fig. 9 to finish off the second slope of the wheel tread which is at a different angle. This tool 4 is another contour tool for performing another finishing operation.

This constitutes a very simple locking device for the turret. The ball construction reduces the friction against the turning of the turret. It would be very undesirable to have the turret actually lift from its seat at a time when it is being rotated because the scale and grit from the turning operations would quickly score and cut the bottom surface of the turret and the top surface of the turret seat. The construction of the ball bearing with the spring above it provides for an easy rotation of the turret, and at the same time does not allow the turret to lift off its seat. The spring is made so that it may have a lifting capacity of say 75 to 90% of the weight of the turret with the tools mounted thereon. Unscrewing the clamping-down stud unclamps the turret. Further unscrewing of the stud compresses the spring thereby placing a load on the ball bearing of 75 to 90% of the weight of the turret.

The arrangement of the tools is an important feature because it permits of the first three operations without turning the turret at all, which is not possible with the constructions heretofore on the market. No tool changes are necessary except for grinding or replacement.

Although we have illustrated and described only a single form of the invention and shown it as applied to a specific operation, we are aware of the fact that modifications can be made therein either for this purpose, or to apply it to other analogous operations without departing from the scope of the invention as expressed in the claims.

Therefore we do not wish to be limited in this respect, but what we do claim is:—

1. In a turret tool holder, the combination of a slide movable toward and from the work, the slide having a centrally perforated circular projection thereon, a bushing filling one end of said perforation, a bolt adapted to screw into the bushing in the slide and extending centrally through said perforation and spaced from the projection and upwardly therefrom and having a flange on the top, a turret fitting on and centered by said projection and adapted to swing around upon it, said bolt being adapted to hold the turret down on the slide in fixed position when tightened up and to permit the turret to be turned when loosened, and a ball bearing carried by said bolt for carrying the pressure of said turret.

2. In a turret tool holder, the combination of a slide, a bolt adapted to screw into the slide and extending upwardly therefrom, a turret centered on said bolt and adapted to swing around upon it, and having two finished opposite recesses therein, a bolt movable along the slide and adapted to engage one of the recesses to hold the turret positively against turning, a lever pivoted on the slide and having a sidewise extending handle leaving the space above the bolt unobstructed, a link connecting said lever with the slidable bolt and having a turn-buckle for adjusting its length, and a stop located in position at one side of the link and at the same level to stop the motion of the toggle lever just as it passes its center to hold the sliding bolt rigidly in position in either of said recesses.

3. In a turret tool holder, the combination with a slide, of a bolt extending upwardly therefrom, a turret fitting on said bolt and adapted to swing around upon it, a ball bearing carried by said bolt for carrying the pressure of said turret, and means for holding said turret in two opposite positions, said turret having means for supporting and holding at one end thereof a roughing tool for roughing off the tread of a wheel, a contour roughing tool for roughing off the flange, and a contour finishing tool for finishing the first slope of the tread and flange all located along one end of the turret.

4. In a turret tool holder, the combination with a slide, of a turret mounted to turn about a vertical axis on said slide, said tool holder having means on one end for supporting two roughing tools and a contour finishing tool and having means on the other end for supporting a contour finishing tool for the second slope of the tread, and means for clamping the turret in fixed position and for unlocking it to permit of the turret being turned through an arc of 180 degrees after the first three tools have performed their operation.

In testimony whereof we have hereunto affixed our signatures.

ARTHUR CHARLES GOUGH.
MARMADUKE MOORE WILLS.